(12) United States Patent
Takada

(10) Patent No.: US 10,161,274 B2
(45) Date of Patent: Dec. 25, 2018

(54) HYDRAULIC CONTROL VALVE AND VALVE-TIMING CONTROL DEVICE FOR INTERNAL-COMBUSTION ENGINE USING HYDRAULIC CONTROL VALVE

(71) Applicant: HITACHI AUTOMOTIVE SYSTEMS, LTD., Hitachinaka-shi, Ibaraki (JP)

(72) Inventor: Yasuhide Takada, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 137 days.

(21) Appl. No.: 15/500,746

(22) PCT Filed: May 26, 2015

(86) PCT No.: PCT/JP2015/065001
§ 371 (c)(1),
(2) Date: Jan. 31, 2017

(87) PCT Pub. No.: WO2016/021280
PCT Pub. Date: Feb. 11, 2016

(65) Prior Publication Data
US 2017/0218797 A1    Aug. 3, 2017

(30) Foreign Application Priority Data

Aug. 4, 2014    (JP) .................. 2014-158346

(51) Int. Cl.
*F01L 1/46* (2006.01)
*F01L 1/344* (2006.01)
(Continued)

(52) U.S. Cl.
CPC ............. *F01L 1/3442* (2013.01); *F01L 1/356* (2013.01); *F16K 3/24* (2013.01); *F16K 11/07* (2013.01);
(Continued)

(58) Field of Classification Search
CPC ..... F01L 2001/3443; F01L 2001/34433; F01L 1/46; F01L 2101/00
(Continued)

(56) References Cited

U.S. PATENT DOCUMENTS 7,025,023 B2    4/2006    Lehmann et al.
7,389,756 B2    6/2008    Hoppe et al.
(Continued)

FOREIGN PATENT DOCUMENTS

DE    10 2008 057 491 A1    5/2010
JP    11-287333 A    10/1999
(Continued)

*Primary Examiner* — Jorge Leon, Jr.
(74) *Attorney, Agent, or Firm* — Foley & Lardner LLP

(57) ABSTRACT

A hydraulic control valve allows increased flexibility of port layout without requiring high dimensional accuracy. The hydraulic control valve includes a cylindrical valve body having, at a cylindrical shaft portion, retard and advance ports and reintroduction ports, and a spool valve provided slidably in an axial direction in the valve body and permitting switching between supply/discharge of working fluid to/from retard and advance hydraulic chambers through land portions. The control valve further includes a cylindrical sleeve formed with synthetic resin material and fixed to an outer peripheral surface of the cylindrical shaft portion, and an actuator that moves the spool valve in an axial direction. The sleeve has, at a peripheral wall thereof, retard and advance oil passage holes communicating with retard and advance ports, and has, on an inner peripheral surface thereof, communication grooves communicating with the reintroduction ports.

16 Claims, 11 Drawing Sheets

(51) Int. Cl.
 *F01L 1/356* (2006.01)
 *F16K 3/24* (2006.01)
 *F16K 11/07* (2006.01)
(52) U.S. Cl.
 CPC ......... *F01L 1/46* (2013.01); *F01L 2001/3443* (2013.01); *F01L 2001/34426* (2013.01); *F01L 2001/34433* (2013.01); *F01L 2101/00* (2013.01)
(58) Field of Classification Search
 USPC ........................................... 123/90.15, 90.17
 See application file for complete search history.

(56) References Cited

U.S. PATENT DOCUMENTS

| | | | |
|---|---|---|---|
| 2002/0134444 | A1 | 9/2002 | Isobe |
| 2006/0000434 | A1 | 1/2006 | Yoshijima et al. |
| 2012/0085436 | A1 | 4/2012 | Jones et al. |
| 2012/0145105 | A1 | 6/2012 | Bayrakdar |
| 2013/0199475 | A1* | 8/2013 | Schafer ................ F01L 1/3442 123/90.17 |

FOREIGN PATENT DOCUMENTS

| | | |
|---|---|---|
| JP | 2002-286151 A | 10/2002 |
| JP | 2012-532286 A | 12/2012 |
| JP | 2013-057338 A | 3/2013 |
| JP | 2013-100768 A | 5/2013 |

\* cited by examiner

HYDRAULIC CONTROL VALVE AND VALVE-TIMING CONTROL DEVICE FOR INTERNAL-COMBUSTION ENGINE USING HYDRAULIC CONTROL VALVE

TECHNICAL FIELD

The present invention relates to a hydraulic control valve used for a valve timing control device that variably controls open and closure timing of an intake valve and/or an exhaust valve of an internal combustion engine in accordance with an engine operating condition.

BACKGROUND ART

As a related art hydraulic control valve used for the valve timing control device of the internal combustion engine, various kinds of hydraulic control valves have been provided. One of such hydraulic control valves has been disclosed in the following Patent Document 1.

As a brief explanation, the hydraulic control valve has a cylindrical valve body serving as a cam bolt that fixes a vane rotor to an axial direction one end portion of a camshaft, a cylindrical sleeve accommodated and fixed inside the valve body, a spool valve provided slidably along an axial direction inside the sleeve and a solenoid pressing the spool valve to the other direction against a spring force of a valve spring that forces the spool valve to one direction.

The valve body has, at a peripheral wall thereof, a plurality of ports that penetrate the peripheral wall in a radial direction and communicate with advance hydraulic chambers and retard hydraulic chambers etc. On the other hand, the sleeve has, on an outer peripheral surface thereof, a plurality of communication passages formed along an axial direction of the sleeve. Further, a plurality of communication holes are formed at an axial direction end portions of the communication passages and on a peripheral wall of the outer peripheral surface of the sleeve.

The spool valve slides in the axial direction by a control current that is outputted to the solenoid from a control unit, and controls opening areas of each communication hole and each communication passage of the sleeve through oil holes formed on a peripheral surface of the spool valve.

By moving the spool valve in the axial direction in accordance with an engine operating condition, the communication passage and the port properly communicate with each other, and oil pumped out from an oil pump is selectively supplied to and discharged from advance hydraulic chambers and retard hydraulic chambers of the vane rotor, then a relative rotation phase of the camshaft with respect to a crankshaft is varied.

CITATION LIST

Patent Document

Patent Document 1: U.S. Pat. No. 7,389,756

SUMMARY OF THE INVENTION

Technical Problem

In Patent Document 1, however, in order to increase flexibility of layout in the axial direction of each port of the valve body, the hydraulic control valve has a structure in which the plurality of communication passages extending along the axial direction are formed on the outer peripheral surface of the sleeve, the plurality of communication holes communicating with the ports are formed at the axial direction end portions of the communication passages and at the other portions on the peripheral wall of the sleeve, and the spool valve is slidably provided inside the sleeve.

Because of this, the hydraulic control valve requires a complex or sophisticated structure. In addition, because it is required to secure slidability of the spool valve on an inner peripheral surface of the sleeve while forming the communication passages at the sleeve, high accuracy of dimensions is required of the sleeve. Cost of manufacturing operation therefore increases.

An object of the present invention is therefore to provide a hydraulic control valve that is capable of increasing the flexibility of layout in the axial direction of the ports formed at the valve body without requiring high accuracy of dimensions of each component.

Solution to Problem

A hydraulic control valve comprises a cylindrical valve body having, at a peripheral wall thereof, a plurality of ports which penetrate the peripheral wall in a radial direction and through which working fluid flows; a cylindrical spool valve provided slidably in an axial direction in the valve body and switching between opening and closure of each of the plurality of ports in accordance with a sliding position of the spool valve; and a cylindrical sleeve fixed to an outer peripheral surface of the valve body in the axial direction, the sleeve having, at a peripheral wall thereof, communication holes which penetrate the peripheral wall in a radial direction and communicate with the plurality of ports and also having, on an inner peripheral surface thereof, communication passages which extend in an axial direction and communicate with at least one of the plurality of ports.

Effects of Invention

According to the present invention, it is possible to increase the flexibility of layout in the axial direction of the ports without requiring high accuracy of dimensions of each component. Manufacturing cost can therefore be reduced.

BRIEF DESCRIPTION OF THE DRAWINGS

FIG. 9A is a longitudinal cross section of a D-D line of FIG. 8. FIG. 9B is a longitudinal cross section of an E-E line of FIG. 8.

FIG. 10A is a longitudinal cross section of a D-D line of FIG. 8. FIG. 10B is a longitudinal cross section of an E-E line of FIG. 8.

FIG. 11A is a longitudinal cross section of a D-D line of FIG. 8. FIG. 11B is a longitudinal cross section of an E-E line of FIG. 8.

EMBODIMENTS FOR CARRYING OUT THE INVENTION

An embodiment of a hydraulic control valve of the present invention applied to a valve timing control device of an internal combustion engine will be explained with reference to the drawings.

Figure 1:
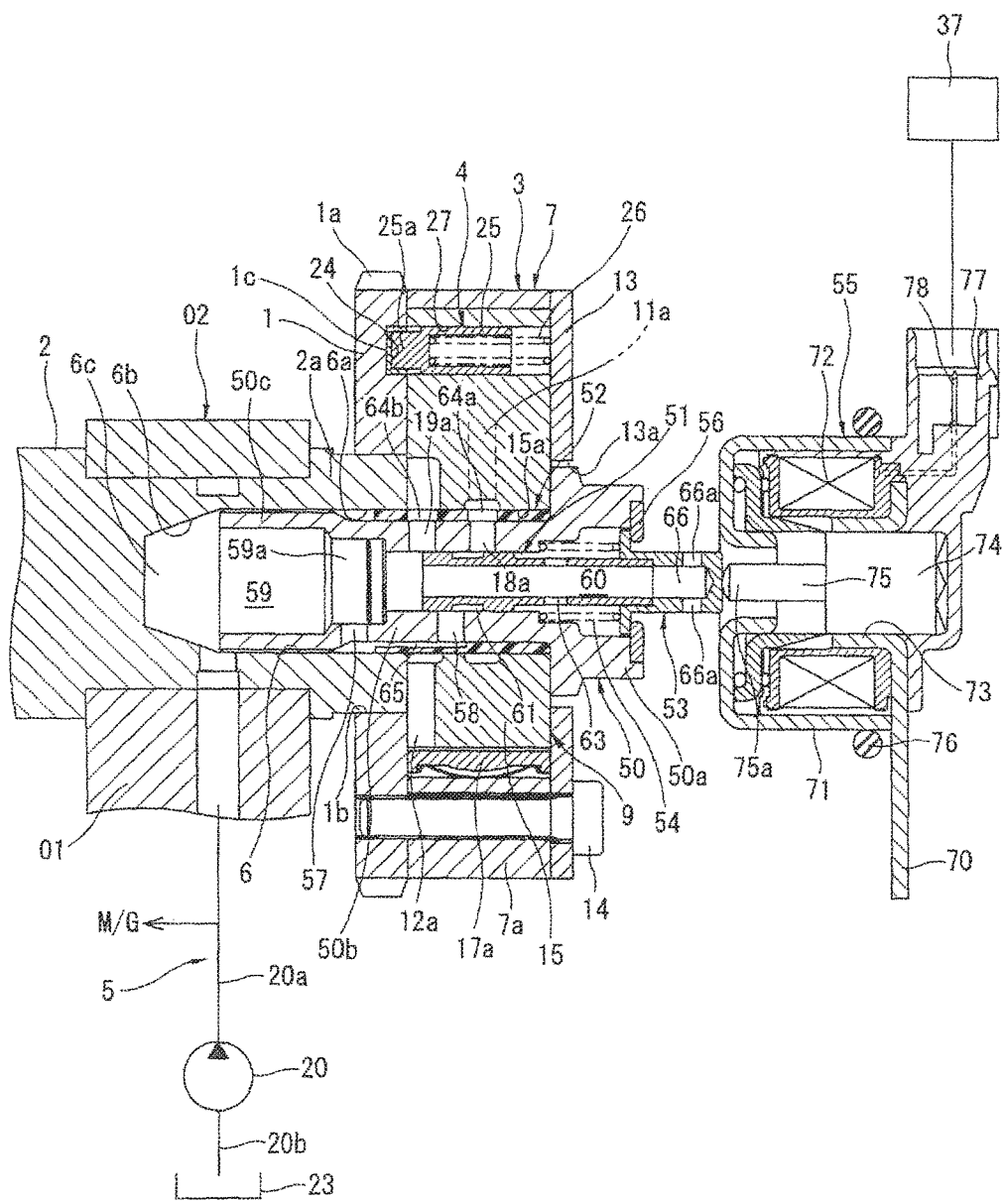
FIG. 1 is a longitudinal cross section showing a general configuration of a valve timing control device to which a hydraulic control valve of the present invention is applied.
Figure 2:
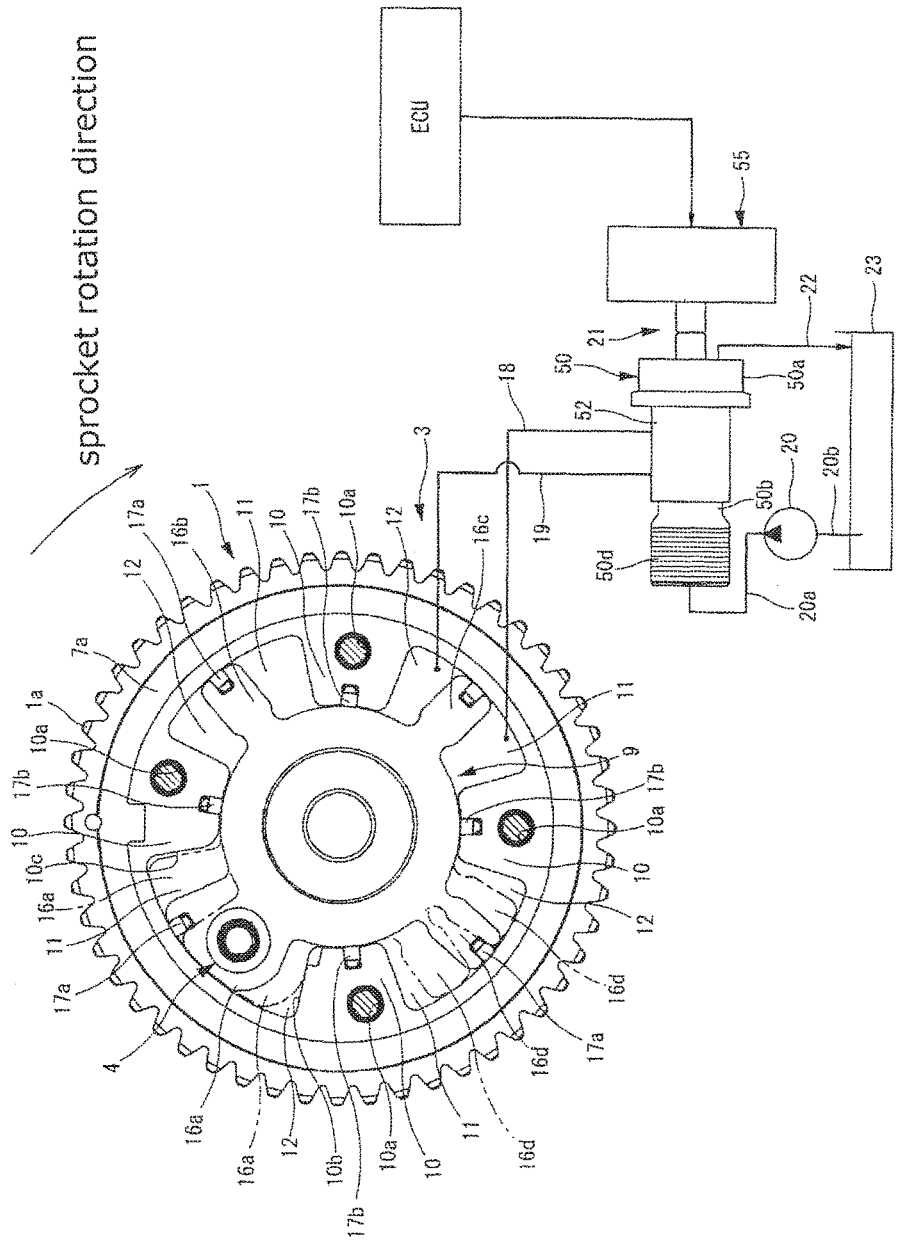
FIG. 2 is a front view showing a state in which a vane rotor used in the present embodiment is held in a middle phase rotation position.

As shown in FIGS. 1 and 2, the valve timing control device has a sprocket 1 as a drive rotary member (a drive rotor) which is driven and rotates by an engine crankshaft through a timing chain (not shown), a camshaft 2 on an intake side which is disposed along a longitudinal direction of the engine and capable of rotating relative to the sprocket 1, a phase-change mechanism 3 which is disposed between the sprocket 1 and the camshaft 2 and changes a relative rotation phase between the sprocket 1 and the camshaft 2, a locking mechanism 4 which locks and holds the phase-change mechanism 3 at a most-retarded phase position, and a hydraulic circuit 5 which separately actuates the phase-change mechanism 3 and the locking mechanism 4.

The sprocket 1 is formed into a substantially thick disk shape. The sprocket 1 has, at an outer circumference thereof, a gear wheel (or a toothed wheel) la around which the timing chain is wound. The sprocket 1 serves as a rear cover that covers a rear end opening of an after-mentioned housing. A supporting hole 1b that rotatably supports one end portion 2a of the camshaft 2 is formed in the middle of the sprocket 1.

The camshaft 2 is rotatably supported by a cylinder head 01 through a plurality of camshaft bearings 02. The camshaft 2 has, on an outer peripheral surface thereof, a plurality of oval-shaped rotation cams that are fixedly connected to the camshaft 2 in axial direction positions and actuate intake valves (not shown) as engine valves. Further, the camshaft 2 is provided, in an axial center position in the one end portion 2a, with a bolt hole 6 in order for an after-mentioned cam bolt 50 to screw in.

This bolt hole 6 is formed in the one end portion 2a from a top end side of the one end portion 2a in the axial direction. The bolt hole 6 is formed into a reduced-diameter-stepped shape from an opening front end side toward an inner bottom of the bolt hole 6. The bolt hole 6 has a female thread portion 6a having a uniform diameter at a top end side of the bolt hole 6 and a stepped portion 6b formed into a tapered shape whose diameter is reduced from an rear end of the female thread portion 6a toward the inner bottom of the bolt hole 6. The female thread portion 6a has a female thread formed on an axial direction inner side of the bolt hole 6.

A hydraulic pressure (or an oil) introduction chamber 6c to which hydraulic pressure (or oil) pumped out from an after-mentioned oil pump 20 is supplied is formed inside the stepped portion 6b.

The phase-change mechanism 3 has, as shown in FIGS. 1 and 2, a housing 7 fixedly connected to the sprocket 1 from the axial direction, a vane rotor 9, as a driven rotary member (a driven rotor) which is rotatably accommodated in the housing 7, secured to the one end portion 2a of the camshaft 2 from the axial direction through an after-mentioned valve body 50 serving as the cam bolt 50, and four retard hydraulic chambers 11 and four advance hydraulic chambers 12 as retard working chambers and advance working chambers defined in a working chamber inside the housing 7 by four shoes 10 provided on an inner circumferential surface of an after-mentioned housing body 7a so as to protrude inwards and the vane rotor 9.

The housing 7 is formed by a cylindrical housing body 7a formed as a single component with sintered metal, a front cover 13 formed by a press molding process and closing or covering a front end opening of the housing body 7a, and the sprocket 1 as the rear cover covering the rear end opening of the housing 7. The housing body 7a, the front cover 13 and the sprocket 1 are tightened together by four bolts 14 that penetrate respective bolt insertion holes 10a of the four shoes 10, then fixedly connected together. The front cover 13 is provided, in the middle thereof, with a penetration hole 13a having a relatively large diameter. An outer circumferential side inner peripheral surface of the penetration hole 13a seals each of the hydraulic chambers 11, 12.

The vane rotor 9 is formed as a single component with metal material. The vane rotor 9 has a rotor portion 15 secured to the one end portion 2a of the camshaft 2 by the valve body 50 and four vanes 16a to 16d arranged at substantially regular intervals of 90° in a circumferential direction on an outer circumferential surface of the rotor portion 15 and protruding in a radial direction.

The rotor portion 15 has a cylindrical shape having a relatively large diameter. The rotor portion 15 is provided, in the middle thereof, with a bolt insertion hole 15a penetrating the rotor portion 15 and leading to the female thread hole 6a of the camshaft 2 in the axial direction. A top end surface of the one end portion 2a of the camshaft 2 contacts a rear end surface of the rotor portion 15.

On the other hand, the vanes 16a to 16d are formed so as to have a relatively small protrusion length (or a relatively short protrusion height). Each of the vanes 16a to 16d is placed between the adjacent two of the shoes 10. The vanes 16a to 16d have a substantially same circumferential direction width, and have a thick plate shape. Seal members 17a and 17b that seal gaps between the inner circumferential surface of the housing body 7a and the outer circumferential surface of the rotor portion 15 are provided on outer peripheral surfaces of the vanes 16a to 16d and at top ends of the shoes 10 respectively.

The vane rotor 9 is configured so that when the vane rotor 9 relatively rotates to a retarded angle side, as shown by a dashed line in FIG. 2, one side surface of the first vane 16a contacts a protrusion surface 10b formed on an opposing side surface of one shoe 10, then a rotation position at the most-retarded angle side of the vane rotor 9 is limited. Likewise, the vane rotor 9 is configured so that when the vane rotor 9 relatively rotates to an advanced angle side, as shown by a two-dot chain line in FIG. 2, the other side surface of the first vane 16a contacts an opposing side surface of the other shoe 10, then a rotation position at the most-advanced angle side of the vane rotor 9 is limited.

At this time (when the vane rotor 9 is positioned at the most-retarded angle position or the most-advanced angle position), with regard to the other vanes 16b to 16d, both side surfaces of each of the vanes 16b to 16d do not contact the respective opposing surfaces of the shoes 10 which face the side surfaces of the vanes 16b to 16d in the circumferential direction, namely that the vanes 16b to 16d are in a no-contact state with each shoe 10. Therefore, contact accuracy of the vane rotor 9 and the shoes 10 is improved. In addition, a supply speed of hydraulic pressure to each of the hydraulic chambers 11, 12 increases, thereby improving a forward/backward rotation response of the vane rotor 9.

Between the both side surfaces in forward/backward rotation directions of the vanes 16a to 16d and the respective both side surfaces of the shoes 10, the retard hydraulic chambers 11 and the advance hydraulic chambers 12 are defined. Each of the retard hydraulic chambers 11 and each of the advance hydraulic chambers 12 communicate with the after-mentioned hydraulic circuit 5 through a retard side communication passage 11a and an advance side communication passage 12a that are formed in a substantially radial direction at an inside of the rotor portion 15.

The locking mechanism 4 is a mechanism that holds the vane rotor 9 at the most-retarded angle side rotation position (the position shown by the dashed line in FIG. 2) with respect to the housing 7.

That is, the locking mechanism 4 mainly has, as shown in FIGS. 1 and 2, a lock hole forming section 1c (shown only in FIG. 1) which is press-fixed to a predetermined position on an inner peripheral side of the sprocket 1, a lock hole 24 formed in the lock hole forming section 1c, a lock pin 25 which is provided so as to be able to move forward and backward in a sliding hole 27 formed at an inside of the first vane 16a of the vane rotor 9 in the axial direction and whose small diameter top end portion 25a is engaged with and disengaged from the lock hole 24 for lock and release of the vane rotor 9, a coil spring 26 which forces the lock pin 25 toward the lock hole 24, a lock-release hydraulic pressure receiving chamber (not shown) which is provided inside the lock hole 24 and releases the engagement of the lock pin 25 by a supplied hydraulic pressure by moving the lock pin 25 backward from the lock hole 24 against a spring force of the coil spring 26, and a lock passage which supplies the hydraulic pressure into the lock-release hydraulic pressure receiving chamber.

The lock hole 24 has a circular shape having a diameter that is sufficiently greater than an outside diameter of the small diameter top end portion 25a of the lock pin 25. The lock hole 24 is formed on the inner peripheral surface of the sprocket 1 at a position corresponding to the most-retarded angle side rotation position of the vane rotor 9.

The lock pin 25 is configured so that when a pressure receiving surface of the top end portion 25a receives the hydraulic pressure supplied to the lock-release hydraulic pressure receiving chamber, the lock pin 25 moves backward and comes out from the lock hole 24, and the lock is released. Further, the lock pin 25 is configured so that when the top end portion 25a enters and is engaged with the lock hole 24 by the spring force of the coil spring 26 provided at rear end side of the lock pin 25, the vane rotor 9 is held and locked with respect to the housing 7.

The hydraulic circuit 5 has, as shown in FIGS. 1 and 2, a retard oil passage 18 that supplies and discharges the hydraulic pressure (or the oil) to and from each retard hydraulic chamber 11 through the retard side communication passage 11a, an advance oil passage 19 that supplies and discharges the hydraulic pressure (or the oil) to and from each advance hydraulic chamber 12 through the advance side communication passage 12a, the lock passage that supplies and discharges the hydraulic pressure (or the oil) to and from the lock-release hydraulic pressure receiving chamber, an oil pump 20 that selectively supplies working fluid to the retard and advance oil passages 18 and 19, and a single-unit electromagnetic switching valve 21 as the hydraulic control valve that switches the oil passage between the retard oil passage 18 and the advance oil passage 19 in accordance with an engine operating condition.

One end portion of the retard oil passage 18 and one end portion of the advance oil passage 19 are respectively connected to retard oil passage holes 64a and advance oil passage holes 64b of an after-mentioned sleeve 52 of the electromagnetic switching valve 21, while the other end side of the retard oil passage 18 and the other end side of the advance oil passage 19 communicate with the retard hydraulic chambers 11 and the advance hydraulic chambers 12 through the retard side communication passage 11a and the advance side communication passage 12a respectively.

The lock passage is configured to communicate with the retard oil passage 18 and supply and discharge the hydraulic pressure (or the oil), which is supplied to and discharged from the retard hydraulic chambers 11, to and from the lock-release hydraulic pressure receiving chamber.

The oil pump 20 is a generally used pump such as a trochoid pump that is driven by the engine crankshaft. The working fluid pumped up from an oil pan 23 through an oil inlet passage 20b by rotation of outer and inner rotors of the oil pump 20 is discharged through an oil outlet passage 20a, and a part of this discharged working fluid is provided to sliding parts of the internal combustion engine from a main oil gallery M/G, and the other working fluid is provided to the electromagnetic switching valve 21. Here, a filter (not shown) is provided at a downstream side of the oil outlet passage 20a. Further, the oil pump 20 is provided with an oil flow amount control valve (not shown) that controls an oil flow amount to a proper amount by returning surplus working fluid, which flows from the oil pump 20 to the oil outlet passage 20a, to the oil pan 23 through a drain passage 22.

Figure 3:
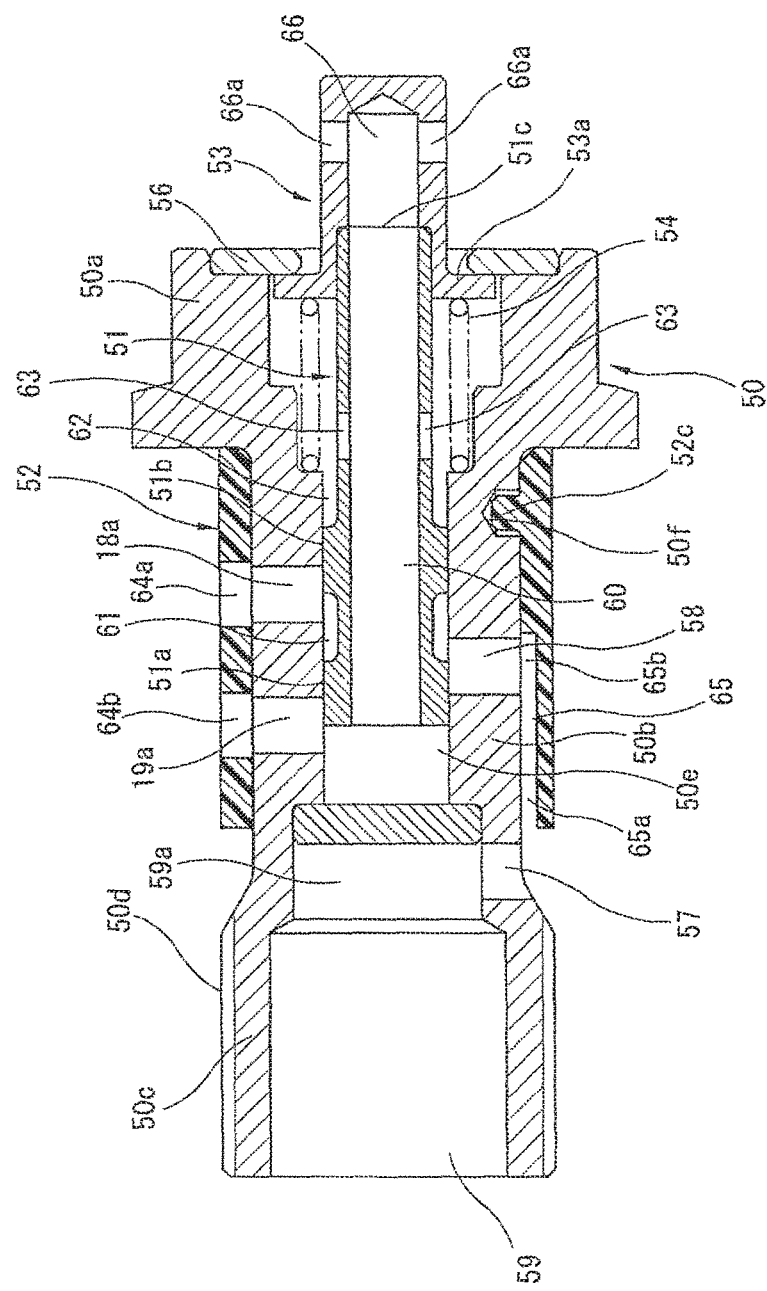
FIG. 3 is a longitudinal cross section of each component or element such as a valve body of an electromagnetic switching valve used in the present embodiment.

As shown in FIGS. 1 and 3, the electromagnetic switching valve 21 is a three-port three-position proportional valve. The electromagnetic switching valve 21 is formed mainly by the cylindrical valve body 50, a cylindrical spool valve 51 provided slidably in the axial direction inside the valve body 50, the cylindrical sleeve 52 fixed to an outer peripheral surface of the valve body 50, a drain plug 53 fixedly press-fitted to a top end of the spool valve 51, a valve spring 54 as a forcing member elastically interposed between the drain plug 53 and a ring-shaped stepped surface formed inside the valve body 50 and forcing the spool valve 51 to a right direction of FIG. 1, and a solenoid unit 55 as an actuator provided at an outer side one end portion of the valve body 50 and moving the spool valve 51 to a left direction of FIG. 1 against a spring force of the valve spring 54.

Figure 4:
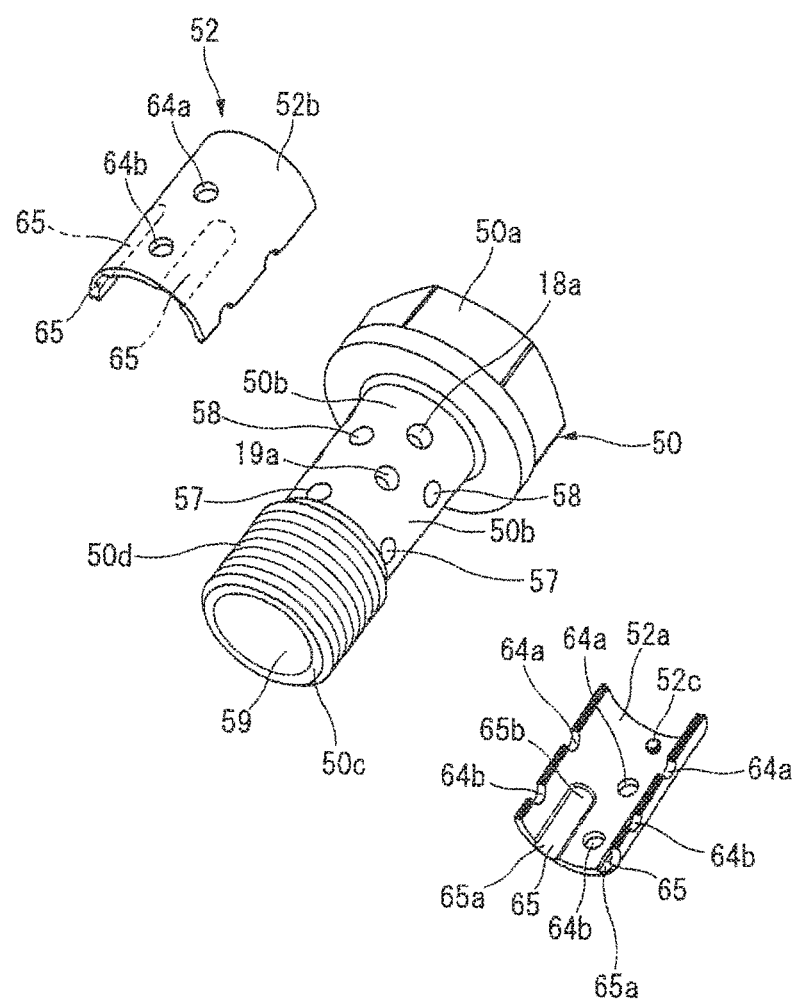
FIG. 4 is a perspective exploded view of the valve body and a sleeve of the electromagnetic switching valve.

The valve body 50 is formed with iron-based metal material. As mentioned above, the valve body 50 serves as the cam bolt. As shown in FIGS. 1, 3 and 4, the valve body 50 mainly has a head portion 50a on the solenoid unit 55 side, a cylindrical shaft portion 50b extending from a base or root of the head portion 50a in the axial direction, a large diameter cylindrical portion 50c formed at a top end side of the cylindrical shaft portion 50b and having on an outer peripheral surface thereof a male thread portion 50d that screws in the female thread portion (the female thread hole)

6a of the camshaft 2, and a sliding hole 50e formed inside the valve body 50 from a top end surface side of the head portion 50a in the axial direction.

The head portion 50a has, at an outer circumference thereof, a hexagonal portion to which a tightening tool such as a wrench can be fitted. Further, a ring-shaped stopper 56 that limits a maximum sliding position of the spool valve 51 to the solenoid unit 55 side is press-fixed to an inner circumferential surface of a large diameter groove portion formed inside the head portion 50a at a top end side of the head portion 50a.

Figure 7A:
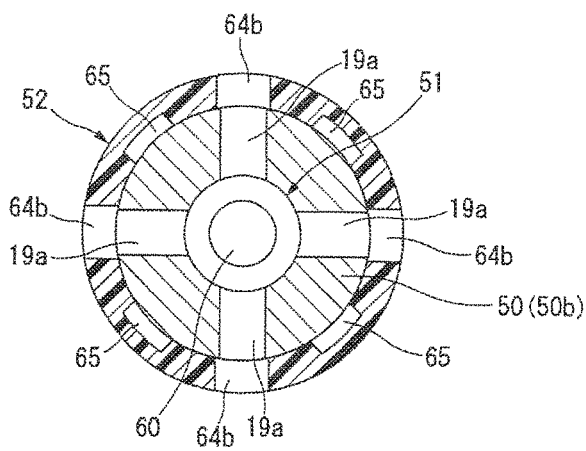
FIG. 7A is a sectional view taken along an A-A line of FIG. 6.
Figure 7B:
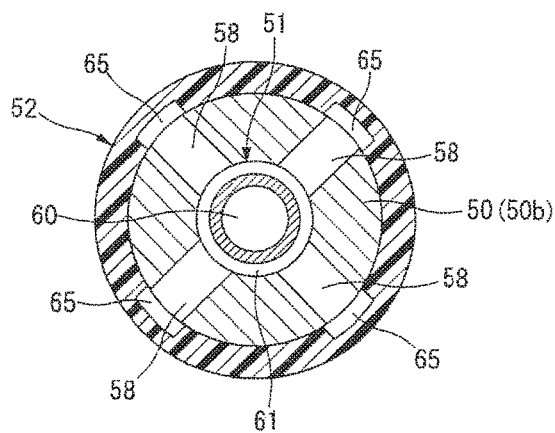
FIG. 7B is a sectional view taken along a B-B line of FIG. 6.
Figure 7C:
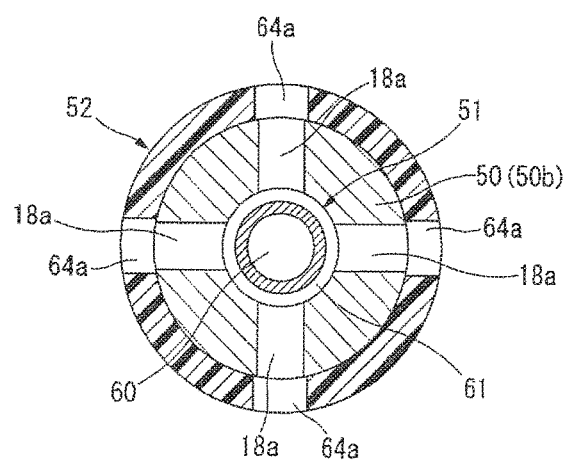
FIG. 7C is a sectional view taken along a C-C line of FIG. 6.
Figure 8:
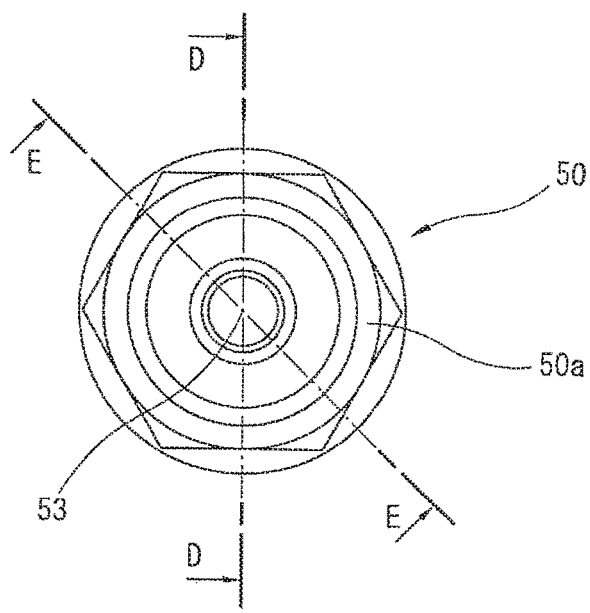
FIG. 8 is a drawing of the valve body, viewed from a right side of the valve body.

As shown in FIGS. 7A to 7C, the cylindrical shaft portion 50b is provided, from the male thread portion 50d side toward the head portion 50a side at a peripheral wall thereof, with four introduction ports 57, four advance ports 19a, four reintroduction ports 58 and four retard ports 18a which are formed into a cruciform in a radial direction. Here, although the four introduction ports 57 are not shown in FIGS. 7A to 7C, the four introduction ports 57 are formed into the cruciform in the radial direction, in the same manner as the other ports.

As shown in FIG. 3, the cylindrical shaft portion 50b is also provided, at a close position to the retard port 18a on an outer peripheral surface thereof, with a positioning hole 50f that is a fitting hole formed in the radial direction for making positioning of the sleeve 52.

An introduction passage 59 that communicates with the hydraulic pressure introduction chamber 6c of the camshaft 2 from the axial direction is formed inside the large diameter cylindrical portion 50c. Hydraulic pressure (or oil) pumped out from the oil outlet passage 20a by the oil pump 20 is supplied to the introduction passage 59 through the hydraulic pressure introduction chamber 6c. The introduction passage 59 is formed into a stepped shape, and each of the introduction ports 57 communicates with a small diameter portion 59a formed at an inner side of the introduction passage 59.

The spool valve 51 is provided, as shown in FIG. 3, with a drain passage 60 that penetrates the spool valve 51 in the axial direction. Further, two cylindrical-column land portions (valve portions); first and second land portions 51a and 51b, are formed at an axial direction one end portion side of an outer periphery of the spool valve 51 on the small diameter portion 59a side. Between these first and second land portions 51a and 51b, a groove 61 that properly communicates with the retard ports 18a, the advance ports 19a and the reintroduction ports 58 in accordance with a sliding position of the spool valve 51 is formed. In addition, a discharge passage 62 is formed along the axial direction on the outer peripheral surface of the spool valve 51 from the second land portion 51b to the drain plug 53. Moreover, drain holes 63 through which the discharge passage 62 and the drain passage 60 communicate with each other are formed along the radial direction on a peripheral wall of the spool valve 51 on an opposite side to the land portions 51a and 51b in the axial direction.

As shown in FIG. 3, the drain plug 53 is formed into a substantially bottomed cylindrical shape with the same metal material as that of the spool valve 51. The drain plug 53 is press-fixed to the spool valve 51 from the axial direction so as to be fitted to and cover one end opening 51c of the spool valve 51. The drain plug 53 has, at one end portion of an outer circumference thereof on the spool valve 51 side, a flange portion 53a formed integrally with the drain plug 53 for elastically supporting one end portion of the valve spring 54. The drain plug 53 also has a drain chamber 66 formed inside the drain plug 53 in the axial direction and communicating with the drain passage 60 from the axial direction. Further, the drain plug 53 is provided, at a top end side peripheral wall thereof, with a pair of openings 66a formed in the radial direction through which the drain chamber 66 communicates with the outside.

The flange portion 53a contacts an inner peripheral portion of the stopper 56 from the axial direction, then limits a maximum movement position of the spool valve 51 to an outward direction.

Figure 5:
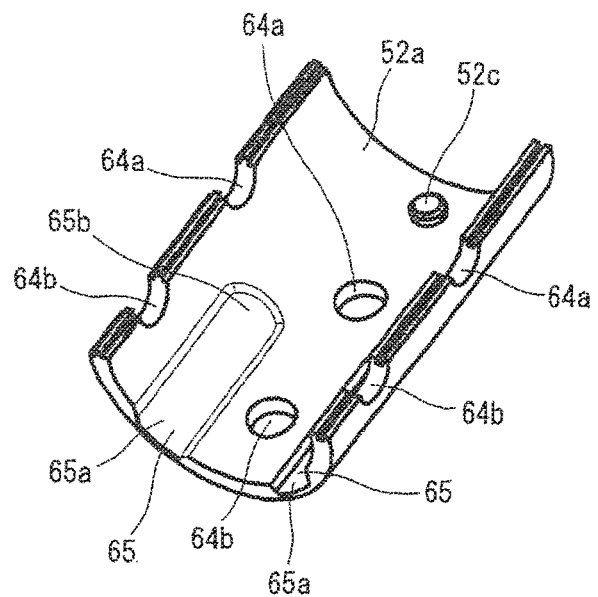
FIG. 5 is a perspective view of one split part of the sleeve.
Figure 6:
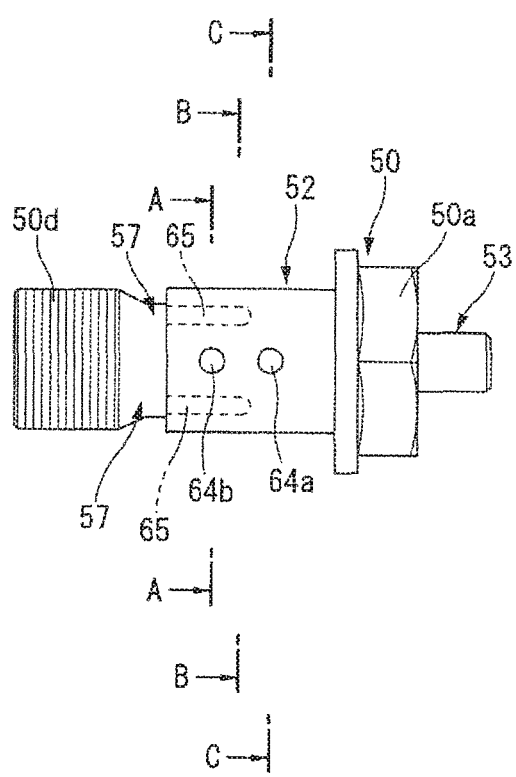
FIG. 6 is a side view of the valve body.

As shown in FIGS. 3 to 5, the sleeve 52 is formed with synthetic resin material, and is split into two parts (half parts, i.e., an upper sleeve and a lower sleeve) in the radial direction. Both these split parts 52a and 52b are fitted together from the radial direction, and coupled or joined together, for instance, by welding, then a cylindrical one-piece sleeve is formed. An inner peripheral surface of the sleeve 52 is fitted onto the outer peripheral surface of the cylindrical shaft portion 50b of the valve body 50, then the sleeve 52 is fixed to valve body 50. One split part 52a of the sleeve 52 is provided, at a substantially middle position in a circumferential direction thereof, with a protrusion 52c, and this protrusion 52c is fitted into the positioning hole 50f of the cylindrical shaft portion 50b, thereby making positioning of the sleeve 52 in a rotation direction and in the axial direction with respect to the valve body 50 and also fixing the sleeve 52 to the valve body 50.

Here, both split parts 52a and 52b could be joined by snap-fit etc.

The above-mentioned retard oil passage holes 64a and advance oil passage holes 64b as communication holes are formed at the sleeve 52 at positions corresponding to the retard ports 18a and the advance ports 19a of the valve body 50 respectively so that positions of the retard and advance oil passage holes 64a and 64b and positions of the retard and advance ports 18a and 19a coincide respectively. Further, four communication grooves 65 that communicate with the corresponding four reintroduction ports 58 are formed along the axial direction on inner peripheral surfaces of the split parts 52a and 52b (the split parts 52a and 52b each have two communication grooves 65).

These communication grooves 65 form communication passages between the inner peripheral surface of the sleeve 52 and the outer peripheral surface of the cylindrical shaft portion 50b of the valve body 50. The communication grooves 65 extend along the axial direction from outer end portions 65a, on the large diameter cylindrical portion 50c side of the valve body 50, of the split parts 52a and 52b. Inner end portions 65b of the communication grooves 65 extend up to positions corresponding to the reintroduction ports 58. The outer end portions 65a communicate with the introduction ports 57 all the time through a passage portion formed between an inner peripheral surface of the female thread portion 6a of the bolt hole 6 of the camshaft 2 and the outer end portions 65a.

The solenoid unit 55 mainly has, as shown in FIG. 1, a solenoid casing 71 fixed to a chain cover (not shown) through a bracket 70 with bolts, a coil 72 accommodated and supported in the solenoid casing 71 and receiving a control current outputted from an engine control unit (ECU) 37, a cylindrical fixed yoke 73 fixed to an inner peripheral side of the coil 72, a movable plunger 74 provided slidably in the axial direction in the fixed yoke 73, and a drive rod 75 formed integrally with the movable plunger 74 at a top end of the movable plunger 74 and pressing the spool valve 51 to the left direction of FIG. 1 against the spring force of the valve spring 54 with a top end portion 75a of the drive rod 75 contacting a bottom wall of the drain plug 53 from the axial direction.

The solenoid casing 71 is retained in a retaining hole of the chain cover by a seal ring 76. A synthetic resin-made connector 77 having therein terminals 78 that are connected to the ECU 37 is fixed to a rear end side of the solenoid casing 71.

As shown in FIGS. 9A and 9B to 11A and 11B, the solenoid unit 55 is configured so that, by a relative hydraulic pressure by the control current of the ECU 37 and the spring force of the valve spring 54, the spool valve 51 moves to three positions in forward and backward axial directions, then the groove 61 and the discharge passage 62 of the spool valve 51 communicate with the retard ports 18a and the advance ports 19a of the valve body 50, or opening ends of the retard ports 18a and the advance ports 19a are closed by the first and second land portions 51a and 51b then their communications are blocked.

The introduction passage 59, the introduction ports 57, the communication grooves 65 and the reintroduction ports 58 communicate with each other all the time at any sliding position of the spool valve 51. Therefore, the hydraulic pressure (or oil) pumped out by the oil pump 20 is supplied to the reintroduction ports 58 from the introduction passage 59 through the introduction ports 57 and the communication grooves 65 all the time.

A computer in the ECU 37 inputs information signals from various sensors such as a crank angle sensor (an engine speed detector), an air flow meter, an engine water temperature sensor, and engine temperature sensor, a throttle valve opening degree sensor and cam angle sensor detecting a current rotation phase of the camshaft 2 (all not shown), and detects a current engine operating condition. Further, as described above, the computer in the ECU 37 controls the movement position of the spool valve 51 by outputting the control current to the coil 72 of the electromagnetic switching valve 21 or interrupting the control current, then selectively switches the ports.

[Operation of Present Embodiment]

Operation or working of the valve timing control device of the present embodiment will be explained.

Figure 9A:
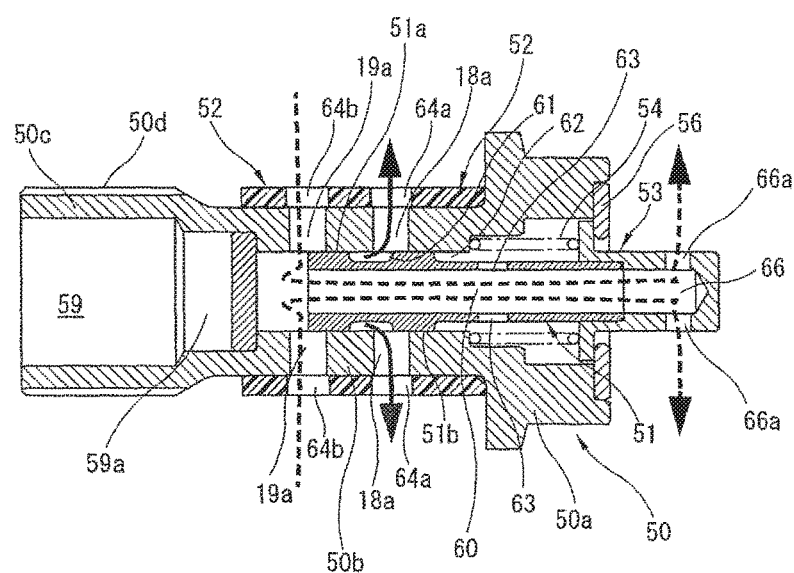
FIGS. 9A and 9B are longitudinal cross sections of the valve body, showing a state in which a spool valve of the electromagnetic switching valve moves to a maximum right direction position.
Figure 9B:
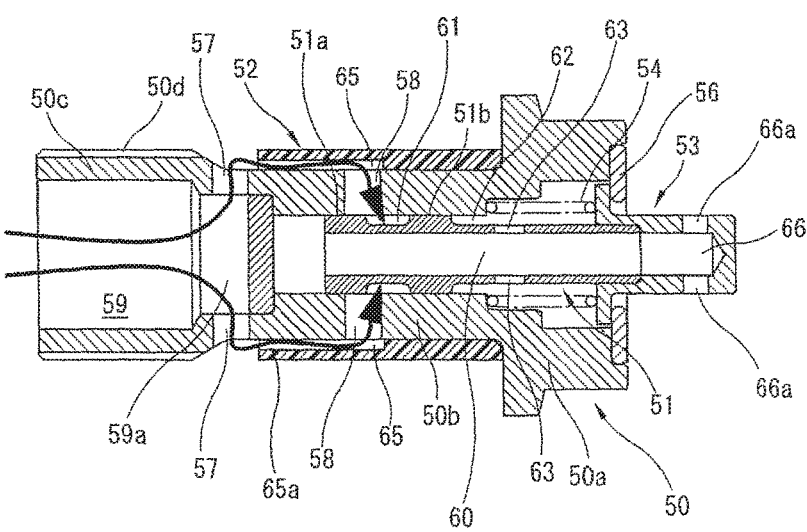

For instance, when the engine stops by an OFF-operation of an ignition switch, since current application to the solenoid unit 55 from the ECU 37 is interrupted, as shown in FIGS. 9A and 9B, the spool valve 51 is held at a maximum right direction position (a first position) by the spring force of the valve spring 54. At this time, the advance ports 19a of the valve body 50 are opened by the first land portion 51a of the spool valve 51, and the advance ports 19a and the drain passage 60 of the spool valve 51 communicate with each other. As a consequence, as shown by broken line arrows in FIG. 9A, the working fluid in the advance hydraulic chambers 12 flows into the drain chamber 66 of the drain plug 53 through the advance oil passage holes 64b of the sleeve 52, the advance ports 19a of the valve body 50 and the drain passage 60 of the spool valve 51, and is discharged to the outside from the openings 66a. With this working, pressure of an inside of each advance hydraulic chamber 12 becomes low.

At the same time, as shown in FIGS. 9A and 9B, the retard ports 18a and the reintroduction ports 58 communicate with each other through the groove 61 of the spool valve 51. Consequently, in this state, the reintroduction ports 58, the communication grooves 65, the introduction ports 57 and the introduction passage 59 communicate with each other.

Since operation of the oil pump 20 stops at this engine stop condition, the hydraulic pressure is not supplied to the retard and advance hydraulic chambers 11 and 12. Therefore, as shown by the dashed line in FIG. 2, the vane rotor 9 relatively rotates in a counterclockwise direction (to the most-retarded angle side) with respect to the sprocket 1 by a negative torque of an alternating torque which acts on the camshaft 2. Accordingly, valve timing of the intake valve is controlled to the most-retarded angle phase.

Here, when the vane rotor 9 is held at the most-retarded angle position at this time, the lock pin 25 moves forward by the spring force of the coil spring 26, and enters and is engaged with the lock hole 24, then the vane rotor 9 is held and locked with respect to the housing 7.

Next, when the engine starts by an ON-operation of the ignition switch, the oil pump 20 also operates, and as shown by arrows in FIGS. 9A and 9B, the hydraulic pressure discharged to the oil outlet passage 20a flows into the communication grooves 65 from the introduction passage 59 through the introduction ports 57, and is supplied to the retard hydraulic chambers 11 from the reintroduction ports 58, the groove 61, the retard ports 18a and the retard oil passage holes 64a through the retard oil passage 18. With this working, the retard hydraulic chambers 11 are brought into a high pressure state. Therefore, since a state in which the vane rotor 9 relatively rotates to the most-retarded angle position is kept, the valve timing of the intake valve is controlled to a retarded angle side, and thus engine startability can be improved.

Here, although the same hydraulic pressure as that of the retard hydraulic chambers 11 is supplied to the lock-release hydraulic pressure receiving chamber through the lock passage at this time point, since hydraulic pressure in the lock-release hydraulic pressure receiving chamber does not rise at an early time of cranking, a lock state is kept with the lock pin 25 engaged with the lock hole 24. It is therefore possible to suppress flutter of the vane rotor 9 due to the alternating torque.

Afterwards, when the hydraulic pressure supplied to the lock-release hydraulic pressure receiving chamber through the lock passage rises, the lock pin 25 moves backward against the spring force of the coil spring 26 and comes out from the lock hole 24, then a lock state is released. With this, the vane rotor 9 is brought into a free state.

At this time, as described above, each advance hydraulic chamber 12 is held in a low pressure state.

Figure 10A:
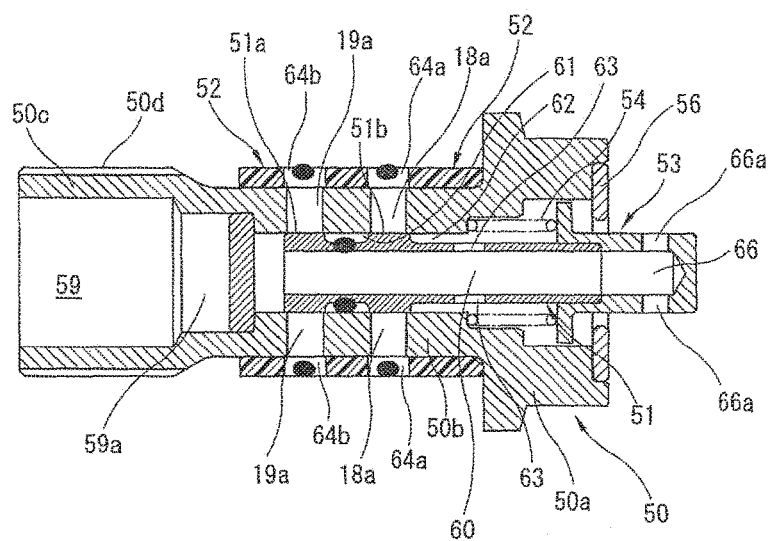
FIGS. 10A and 10B are longitudinal cross sections of the valve body, showing a state in which the spool valve of the electromagnetic switching valve moves to an axial direction middle position.
Figure 10B:
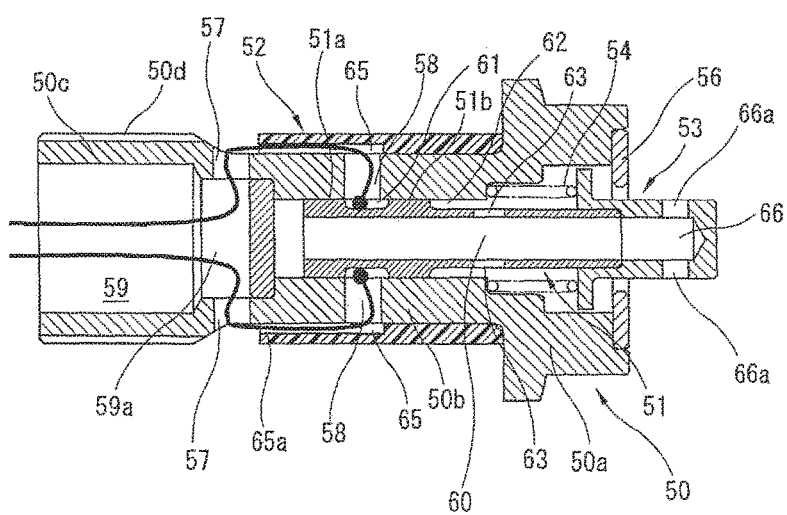

Next, for instance, when an engine condition is changed from an idling operation to a steady operation, a predetermined amount of current is applied to the coil 72 of the solenoid unit 55 from the ECU 37. With this current application, as shown in FIGS. 10A and 10B, the spool valve 51 slightly moves to a left direction (a second position) in the drawings by a pressing force of the drive rod 75 against the spring force of the valve spring 54. In this state, the retard ports 18a and the advance ports 19a are closed by the first and second land portions 51a and 51b. And, although the reintroduction ports 58 communicate with the groove 61, the reintroduction ports 58 are in a closed state by the first and second land portions 51a and 51b.

Because of this, as shown in FIG. 10A, discharge of the working fluid from the retard and advance hydraulic chambers 11 and 12 is stopped, and as shown in FIG. 10B, supply of the working fluid pumped out from the oil pump 20 to the retard and advance hydraulic chambers 11 and 12 is also simultaneously interrupted.

With this working, as shown by a solid line in FIG. 2, the vane rotor 9 is held at a middle position between the most-retarded angle position and the most-advanced angle position. Therefore, the valve timing of the intake valve is controlled to a middle phase between the most-retarded angle phase and the most-advanced angle phase. Stabilization of rotation of the engine and fuel economy in the steady operation can therefore be improved.

Figure 11A:
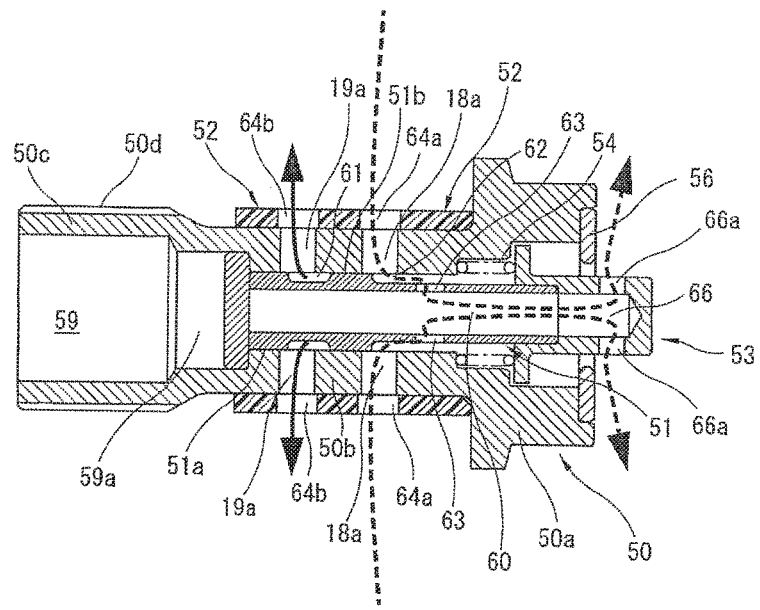
FIGS. 11A and 11B are longitudinal cross sections of the valve body, showing a state in which the spool valve of the electromagnetic switching valve moves to a maximum left direction position.
Figure 11B:
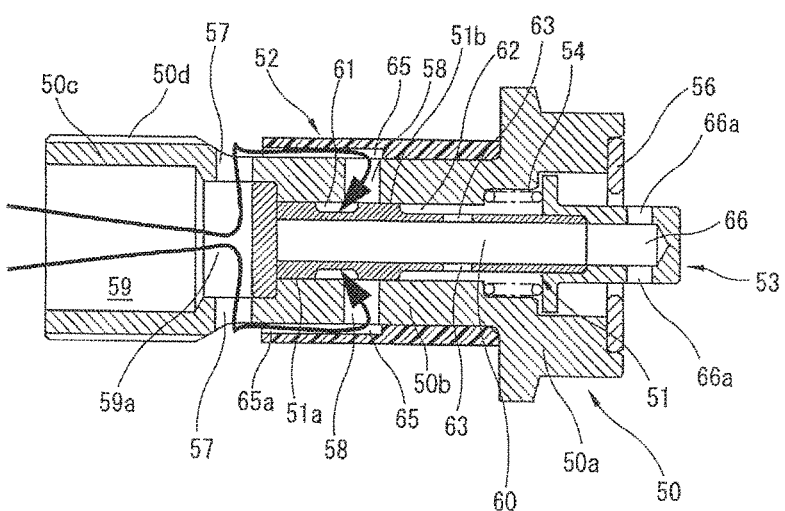

Next, for instance, when the engine condition is changed from the steady operation to a high-rotation high-load region (a high-rotation high-load operation), an even stronger current is applied to the coil 72 of the solenoid unit 55 from the ECU 37. With this current application, as shown in FIGS. 11A and 11B, the spool valve 51 moves to a maximum left direction position (a third position) in the drawings by the pressing force of the drive rod 75 against the spring force of the valve spring 54. With this working, the retard ports 18a communicate with the discharge passage 62, and the reintroduction ports 58 and the advance ports 19a communicate with the groove 61.

As a consequence, as shown by broken line arrows in FIG. 11A, the working fluid in the retard hydraulic chambers 11 flows into the drain passage 60 from the retard oil passage holes 64a through the retard ports 18a, the discharge passage 62 and the drain holes 63, and further continuously flows into the drain chamber 66, then is discharged to the outside through the openings 66a. Therefore, pressure of an inside of each retard hydraulic chamber 11 becomes low.

On the other hand, as for the advance hydraulic chambers 12, as shown by arrows in FIGS. 11A and 11B, the working fluid pumped out by the oil pump 20 is supplied to the advance hydraulic chambers 12 from the groove 61 through the advance ports 19a, the advance oil passage holes 64b and the advance oil passage 19, then the pressure of the inside of each advance hydraulic chamber 12 becomes high.

Therefore, as shown by the two-dot chain line in FIG. 2, the vane rotor 9 relatively rotates in a clockwise direction to the most-advanced angle side. Accordingly, the valve timing of the intake valve is controlled to the most-advanced angle phase. A valve overlap amount of the intake valve thus increases, and an intake charging efficiency is improved, thereby improving an engine torque output.

As explained above, the ECU 37 controls the axial direction movement position of the spool valve 51 by applying the predetermined amount of current to the electromagnetic switching valve 21 or interrupting the current application. Consequently, the phase-change mechanism 3 and the locking mechanism 4 are controlled, then the camshaft 2 is controlled to an optimum relative rotation position with respect to the sprocket 1, thereby improving contact accuracy of the valve timing.

In the present embodiment, the spool valve 51 is provided slidably in the valve body 50, and the sleeve 52 is fixed to the outer peripheral surface of the cylindrical shaft portion 50b of the valve body 50. It is therefore possible to simplify the overall structure of the electromagnetic switching valve 21. Further, since the hydraulic circuit for the passage hole and the port can also be simplified, manufacturing operation efficiency is enhanced, and cost of manufacturing operation is reduced.

In addition, unlike the related art, the sleeve 52 is not provided inside the valve body 50, but is simply fixed to the outer peripheral surface of the valve body 50. Thus, high accuracy of dimensions is not required of the sleeve 52. This also reduces the cost of manufacturing operation.

Further, since the high accuracy of dimensions is not required of the sleeve 52, the sleeve 52 can be formed with the synthetic resin material. Weight reduction of the electromagnetic switching valve 21 can be achieved.

As described above, since the selective switching control of the working fluid is carried out by the valve body 50 and the spool valve 51, there is no need to consider clogging of foreign matter existing in the working fluid which is caused by form or structure of the sleeve 52. That is, the sleeve 52 can be formed with material such as softer synthetic resin material than those of the valve body 50 and the spool valve 51.

Furthermore, the sleeve 52 is formed by two split parts, and the two split parts are joined together by welding. Assembly performance when fixing the sleeve 52 to the valve body 50 is improved.

Moreover, a length (or depth) in the axial direction of the bolt hole 6 is shortened, and a shape in a longitudinal cross section of the bolt hole 6 is simplified. It is therefore possible to facilitate a boring or drilling work of the camshaft 2.

In the present embodiment, two hydraulic pressure controls of the retard and advance hydraulic chambers 11 and 12 and the lock-release hydraulic pressure receiving chamber are carried out by the one electromagnetic switching valve 21. Therefore, flexibility of layout of the device for the engine is increased, and cost reduction can be achieved.

In addition, since the vane rotor 9 is held at the middle phase position by closing each passage hole by the sliding position of the spool valve 51 of the electromagnetic switching valve 21, this holding performance is improved.

The present invention is not limited to the above embodiment. In the above embodiment, the hydraulic control valve is applied to the valve timing control device. However, the hydraulic control valve can be applied to other devices such as an automatic transmission for vehicle.

Further, as the actuator, it is possible to use a pressure force other than electromagnetic force of the solenoid unit 55.

Furthermore, the valve timing control device could be applied to not only the intake valve but also an exhaust valve.

The sleeve 52 could be formed with metal material such as aluminum alloy material by casting. In addition, the sleeve 52 could be formed by a one-piece cylindrical member. The former sleeve can be formed without requiring high accuracy of dimensions. The latter sleeve can reduce parts count.

EXPLANATION OF REFERENCE

1 . . . sprocket
2 . . . camshaft
2a . . . one end portion
3 . . . phase-change mechanism
4 . . . locking mechanism
5 . . . hydraulic circuit
6 . . . bolt hole
6a . . . female thread portion
6b . . . stepped portion
6c . . . introduction chamber
7 . . . housing
7a . . . housing body
9 . . . vane rotor
11 . . . retard hydraulic chamber
12 . . . advance hydraulic chamber
16a-16d . . . vane
18 . . . retard oil passage
19 . . . advance oil passage
18a . . . retard port
19a . . . advance port
20 . . . oil pump 20a . . . oil outlet passage
21 . . . electromagnetic switching valve (control valve)
37 . . . control unit (ECU)
50 . . . valve body (cam bolt)
50a . . . head portion
50b . . . cylindrical shaft portion
50c . . . large diameter cylindrical portion
50d . . . male thread portion
50e . . . sliding hole
51 . . . spool valve
51a, 51b . . . first and second land portions
52 . . . sleeve
53 . . . drain plug
54 . . . valve spring (forcing member)
55 . . . solenoid unit (actuator)
59 . . . introduction passage
60 . . . drain passage
61 . . . groove
62 . . . discharge passage
63 . . . drain hole
64a . . . retard oil passage hole (communication hole)
64b . . . advance oil passage hole (communication hole)
65 . . . communication groove
66 . . . drain chamber
66a . . . opening

The invention claimed is:

1. A hydraulic control valve comprising:
a cylindrical valve body having, at a peripheral wall thereof, a plurality of ports which penetrate the peripheral wall of the valve body in a radial direction and through which working fluid flows;
a cylindrical spool valve provided slidably in an axial direction in the valve body and structured to switch between opening and closure of each of the plurality of ports in accordance with a sliding position of the spool valve; and
a cylindrical sleeve fixed to an outer peripheral surface of the valve body in the axial direction, the sleeve having, at a peripheral wall thereof, communication holes which penetrate the peripheral wall of the sleeve in a radial direction and communicate with the plurality of ports and the sleeve further including, on an inner peripheral surface thereof, communication passages which extend in the axial direction and communicate with at least one of the plurality of ports.

2. The hydraulic control valve as claimed in claim 1, wherein:
the valve body has, at a top end portion thereof, an introduction passage into which the working fluid is introduced.

3. The hydraulic control valve as claimed in claim 2, wherein:
the sleeve is formed with softer material than material of the valve body and the spool valve.

4. The hydraulic control valve as claimed in claim 3, wherein:
the valve body and the spool valve are formed with metal material, and the sleeve is formed with synthetic resin material.

5. The hydraulic control valve as claimed in claim 4, wherein:
the sleeve is separable into an upper sleeve and a lower sleeve configured to be joined in the radial direction.

6. The hydraulic control valve as claimed in claim 4, wherein:
the sleeve has a one-piece cylindrical shape.

7. The hydraulic control valve as claimed in claim 2, wherein:
the sleeve is formed with metal material by casting.

8. The hydraulic control valve as claimed in claim 1, wherein:
the valve body having, at the peripheral wall thereof, an introduction hole which penetrates the peripheral wall of the valve body in the radial direction, and into which the working fluid is introduced.

9. A hydraulic control valve for a valve timing control device of an internal combustion engine, the valve timing control device controlling a relative rotation phase of a camshaft with respect to a crankshaft by actuating a rotor by supply and discharge of working fluid, the hydraulic control valve comprising:
a hollow cam bolt fixing the rotor to a first end portion of the camshaft, the cam bolt having, at a peripheral wall thereof, supply-and-discharge ports which penetrate the peripheral wall of the cam bolt in a radial direction and through which the working fluid flows;
a cylindrical spool valve provided slidably in an axial direction in the cam bolt and structured to switch between opening and closure of each of the supply-and-discharge ports in accordance with a sliding position of the spool valve; and
a hollow sleeve fixed to an outer peripheral surface of the cam bolt in the axial direction, the sleeve having, at a peripheral wall thereof, communication holes which penetrate the peripheral wall of the sleeve in a radial direction and communicate with the supply-and-discharge ports and the sleeve further including, on an inner peripheral surface thereof, communication passages which extend in the axial direction and communicate with at least one of the supply-and-discharge ports.

10. The hydraulic control valve as claimed in claim 9, wherein:
the cam bolt has, at a top end portion thereof, an introduction passage into which the working fluid is introduced.

11. The hydraulic control valve as claimed in claim 10, wherein:
the sleeve is separable into a first sleeve and a second sleeve configured to be joined in the radial direction, the sleeve being formed of synthetic resin material.

12. The hydraulic control valve as claimed in claim 11, wherein:
the communication passages are formed between a communication groove formed along the axial direction on the inner peripheral surface of the sleeve and the outer peripheral surface of the cam bolt.

13. The hydraulic control valve as claimed in claim 12, wherein:
the sleeve has, at the inner peripheral surface thereof, a protrusion, and
the cam bolt has, at the outer peripheral surface thereof, a fitting hole in which the protrusion is fitted, and the sleeve is fixed to the cam bolt by fitting the protrusion in the fitting hole.

14. The hydraulic control valve as claimed in claim 13, wherein:
the sleeve is fixed to the outer peripheral surface of the cam bolt by snap-fit or welding.

15. The hydraulic control valve as claimed in claim 10, wherein:
the sleeve has a one-piece cylindrical shape and is formed of synthetic resin material.

16. A valve timing control device of an internal combustion engine, the valve timing control device comprising:
- a drive rotor to which a turning force is transmitted from an engine crankshaft, the drive rotor having therein a chamber;
- a driven rotor which is fixed to a first end portion of a camshaft and rotatably accommodated in the drive rotor, the driven rotor dividing the chamber into an advance hydraulic chamber and a retard hydraulic chamber, the driven rotor relatively rotating with respect to the drive rotor to an advanced angle side or a retarded angle side by supply and discharge of working fluid to and from the advance and retard hydraulic chambers;
- a hydraulic control valve which controls the supply and discharge of the working fluid, which is pumped out from an oil pump, to and from the advance and retard hydraulic chambers; and
- an actuator which actuates the hydraulic control valve, and the hydraulic control valve including
  - a hollow cam bolt fixing the driven rotor to the first end portion of the camshaft, the cam bolt having, at a peripheral wall thereof, supply-and-discharge ports which penetrate the peripheral wall of the cam bolt in a radial direction and through which the working fluid flows;
  - a cylindrical spool valve provided slidably in an axial direction in the cam bolt and structured to switch between opening and closure of each of the supply-and-discharge ports in accordance with a sliding position of the spool valve; and
  - a hollow sleeve fixed to an outer peripheral surface of the cam bolt in the axial direction, the sleeve having, at a peripheral wall thereof, communication holes which penetrate the peripheral wall of the sleeve in a radial direction and communicate with the supply-and-discharge ports and the sleeve further including, on an inner peripheral surface thereof, communication passages which extend in the axial direction and communicate with at least one of the supply-and-discharge ports.

* * * * *